United States Patent
Kataoka

(10) Patent No.: US 8,411,582 B2
(45) Date of Patent: Apr. 2, 2013

(54) COMMUNICATION CONNECTING METHOD, COMMUNICATION CONNECTING DEVICE AND STORAGE MEDIUM WITH PROGRAM STORED THEREIN

(75) Inventor: Mitsuteru Kataoka, Osaka (JP)

(73) Assignee: Panasonic Corporation, Osaka (JP)

( * ) Notice: Subject to any disclaimer, the term of this patent is extended or adjusted under 35 U.S.C. 154(b) by 1245 days.

(21) Appl. No.: 11/908,196

(22) PCT Filed: Feb. 28, 2006

(86) PCT No.: PCT/JP2006/303661
§ 371 (c)(1),
(2), (4) Date: Sep. 10, 2007

(87) PCT Pub. No.: WO2006/095596
PCT Pub. Date: Sep. 14, 2006

(65) Prior Publication Data
US 2009/0268620 A1    Oct. 29, 2009

(30) Foreign Application Priority Data
Mar. 10, 2005    (JP) .................................. 2005-066965

(51) Int. Cl.
*G06F 11/00* (2006.01)
(52) U.S. Cl. ....................................................... 370/252
(58) Field of Classification Search .................. 370/252, 370/254; 709/220, 222, 225, 227; 348/14.02, 348/14.04, 14.07, 569, 552
See application file for complete search history.

(56) References Cited

U.S. PATENT DOCUMENTS

| 5,959,686 A * | 9/1999 | Jeong ............................. 348/563 |
| 6,822,753 B1 | 11/2004 | Momose |
| 2001/0017620 A1 | 8/2001 | Nara |
| 2005/0120383 A1* | 6/2005 | Ozaki et al. .................... 725/131 |
| 2006/0258389 A1* | 11/2006 | Saito et al. .................. 455/550.1 |
| 2008/0232209 A1* | 9/2008 | Vergoossen et al. ......... 369/47.5 |
| 2008/0297655 A1* | 12/2008 | Kamida ........................ 348/552 |

FOREIGN PATENT DOCUMENTS

| JP | 2001-109617 A | 4/2001 |
| JP | 2001-243158 A | 9/2001 |
| JP | 2004-15558 A | 1/2004 |
| JP | 2004-235960 A | 8/2004 |

OTHER PUBLICATIONS

International Search Reoprt for PCT/JP2006/303661, dated Jun. 6, 2006.

* cited by examiner

Primary Examiner — Fan Ng
(74) Attorney, Agent, or Firm — RatnerPrestia

(57) ABSTRACT

A user is prompted to turn on power supply of a device to be connected with a screen. When it is detected that the power supply is turned on, the screen is displayed for confirming a user whether the device whose power supply is turned on should be connected or not. Thus, connection is carried out. With such a method, a communication connection method capable of selecting a device to be connected reliably is provided.

18 Claims, 7 Drawing Sheets

| Is this device a device to be connected? | | |
|---|---|---|
| No | Yes | |
| Kind of device | Model number | Power supply |
| DVD recorder | DMR-7 | On |
| Projector | PRJ-1 | On |

Turn on/off power supply of device to be connected twice

| Kind of device | Model number | Power supply |
|---|---|---|
| | | |

| Is this device a device to be connected? | | |
|---|---|---|
| No | Yes | |
| Kind of device | Model number | Power supply |
| ***** | D**7 | On |

| Is this device a device to be connected? | | |
|---|---|---|
| No | Yes | |
| Kind of device | Model number | Power supply |
| Rear speaker | RSP10 | On |
| DVD recorder | DMR-7 | On |
| Projector | PRJ-1 | On |

| Is this device a device to be connected? | | |
|---|---|---|
| No | Yes | |
| Kind of device | Model number | Power supply |
| DVD recorder | DMR-7 | On |
| Projector | PRJ-1 | Off |
| Rear speaker | RSP10 | Off |

| Is this device a device to be connected? | | |
|---|---|---|
| No | Yes | |
| Kind of device | Model number | Power supply |
| Rear speaker | RSP10 | On |
| DVD recorder | DMR-7 | On |
| Projector | PRJ-1 | Off |

FIG. 7A  PRIOR ART

| Select device to be connected | | |
|---|---|---|
| Kind of device | Model number | Connection |
| DVD recorder | DMR-7 | No |
| Projector | PRJ-1 | Yes |
| Rear speaker | RSP10 | Yes |
| DVD recorder | DMR-1 | No |

FIG. 7B  PRIOR ART

| Connection is completed | | |
|---|---|---|
| Kind of device | Model number | Connection |
| DVD recorder | DMR-7 | Yes |
| Projector | PRJ-1 | Yes |
| Rear speaker | RSP10 | Yes |
| DVDrecoder | DMR-1 | No | ns # COMMUNICATION CONNECTING METHOD, COMMUNICATION CONNECTING DEVICE AND STORAGE MEDIUM WITH PROGRAM STORED THEREIN

This application is a U.S. National Phase application of PCT International Application PCT/JP2006/303661.

TECHNICAL FIELD

The present invention relates to a communication connection method and device used in a picture or voice reproducing device for carrying out wireless communication such as wireless LAN and wire communication using a power line or television antenna wiring as a communication medium.

BACKGROUND ART

When a television, a video, a DVD (Digital Versatile Disk) recorder, audio equipment, and the like, are purchased and installed at home, input/output terminals are mutually connected and wired by using a copper wire or optical fiber cable. Recently, however, the number of devices capable of being mutually connected at home has increased and simultaneously, wiring to be carried out has become very complicated due to high performance of devices. As a result, it has been very difficult for a general user to connect and wire devices. In addition, a large number of various new standards for connection cables have appeared, and a user must pay for such connection cables.

Since devices such as flat television have achieved light weight, demands for freely carrying a device to a room where a user wants to use it have increased in general. However, if wiring is complicated, such movement cannot be carried out easily.

As a method for dissolving such problems, devices capable of wiring communication therebetween have been proposed. An example of a developed device includes a television which is divided into two housings, i.e., a liquid display unit and a tuner unit, and in which wireless communication is carried out between the two housings. As such a wireless communication technology, for example, wireless LAN (Local Area Network), such as standardized IEEE802.11g used for wireless communication of PC (Personal Computer), has been used. When devices are connected wirelessly, it is not necessary to carry out physical connection in which connection cables are inserted into devices. Furthermore, it is not necessary to purchase connection cables.

Furthermore, Japanese Patent Unexamined Publication No. 2004-235960 discloses a method of periodically trying to detect the presence of devices when a plurality of devices are mutually connected, in which the detection efficiency is improved by relatively increasing the period of detection when the presence of the device cannot be detected.

Furthermore, Japanese Patent Unexamined Publication No. 2004-015558 discloses a method in which when devices are connected mutually, devices are allowed to be physically close and releasing radio wave is relatively weakened so as to limit the arrival range of radio wave to a physically close area, thereby preventing devices that should not be connected from being detected.

Herein, a system including devices connected mutually by using a wireless LAN technology is described with reference to drawings.

FIG. 5 is a diagram showing a configuration of a system of a conventional communication connection device. This system includes communication connection device 510, display device 120b, communication connection device 530, and communication connection device 540. In FIG. 5, communication connection device 510, communication connection device 530 and communication connection device 540 are mutually detectable by wireless communication. Furthermore, to communication connection device 510, display device 120b for displaying to a user is connected. Hereinafter, each device is described.

Communication connection device 510 includes input unit 111b, UI (User Interface) control unit 511, communication unit 113b, device ID 1131b, existence notification detection unit 114b, contents reproduction unit 115b, and drawing unit 116b.

Input unit 111b is an input device to which a physical operation request by a user is input. Input unit 111b is a remote controller and a light receiver using infrared rays, a physical switch built in communication connection device 510, or a pointing device such as a mouse.

UI control unit 511 receives input from input unit 111b, existence notification detection unit 114b and communication unit 113b, and outputs information to be displayed on a screen to drawing unit 116b, and thereby manages state transition of entire communication connection device 510. In particular, by changing a screen to be displayed on display device 120b in accordance with the input from input unit 111b, GUI (Graphic User Interface) is realized.

UI control unit 511 is a built-in computer for controlling, which includes a CPU (Central Processing Unit) and a semiconductor memory for storing and executing a computer program that determines an operation of the CPU. Specific operation of UI control unit 511 is described later with reference to a flowchart shown in FIG. 6.

Communication unit 113b is mutually connected to another communication unit built in another communication connection device, thereby carrying out two-way communication. Communication unit 113b is, for example, an LSI (Large Scale Integrated circuit) for realizing wireless LAN. Communication unit 113b holds device ID 1131b that is ID specific to each communication unit for distinguishing and identifying the communication unit from other communication units.

Device ID 1131b is a device ID stored in communication unit 113b. When communication unit 113b is LSI for wireless LAN, device ID 1131b is, for example, MAC (Media Access Control) address for distinguishing LAN connection devices all over the world.

Existence notification detection unit 114b performs broadcast communication to communication unit 113b with a wireless communication path. When another communication connection device receives a signal of broadcast communication, it detects the existence of communication connection device 510. Furthermore, when existence notification detection unit 114b receives a signal of broadcast communication released by another communication connection device, it can detect the existence of the other communication connection device. Protocol for notifying and detecting the existence of a device in this way is defined by specification of IEEE802.11b.

Contents reproduction unit 115b receives contents that have been received by communication unit 113b, and reproduces and outputs them to drawing unit 116b in accordance with the control by UI control unit 511. Herein, contents include information such as picture, music, and Web page, which a user views via display device 120b. When contents reproduction unit 115b may be MPEG (Motion Picture Expert Group)-2 video decoder when the contents are MPEG-2 video.

Drawing unit 116b receives an input of information for drawing contents output by contents reproduction unit 115b and information for drawing a screen of GUI output by UI control unit 511, generates display information of a screen by synthesizing the above-mentioned information, converts the display information into a signal format that can be input to display device 120b, and outputs it. Drawing unit 116b is a drawing LSI such as a graphic accelerator.

Next, display device 120b is described. Display device 120b receives the output from communication connection device 510, converts it into a physical phenomenon such as screen display or sound which a user can perceive, and presents it to a user. Display device 120b is, for example, a graphics display such as LCD (Liquid Crystal Display) and a speaker.

Then, communication connection device 530 is described. Communication connection device 530 includes input unit 111c, UI control unit 131b, communication unit 113c, device ID 1131c, existence notification detection unit 114c, and contents storage unit 132c.

UI control unit 131b controls state transition of entire communication connection device 530. Contents storage unit 132c stores contents and outputs them to communication unit 113c in accordance with the request from UI control unit 131b. When reproduction of contents is instructed by input unit 111c, UI control unit 131b recognizes this instruction and issues a command to contents storage unit 132c to output contents to communication unit 113c. With this command, contents are input to another communication connection device 510 via communication unit 113c. Thus, the output contents are displayed on display device 120b by way of communication unit 113b, contents reproduction unit 115b, and drawing unit 116b of communication connection device 510.

Next, communication connection device 540 is described. Communication connection device 540 has the same configuration as that of communication connection device 530. However, value of the device ID stored in each communication unit is different from each other, so that communication is carried out in a state in which two communication connection devices can be distinguished from each other.

Next, connection processing by communication connection device 510 is described. Herein, the connection processing is a processing for detecting what device is present as a communication connection device existing within the range in which radio wave can reach.

FIG. 6 is a flowchart showing a connection processing in a conventional communication connection device. FIGS. 7A and 7B are views showing a displayed screen of a conventional communication connection device. Hereinafter, the flow of processing is described in the order shown in steps in FIG. 6.

[1] Existence notification detection unit 114b analyzes information received by communication unit 113b and detects one or a plurality of detectable communication connection devices. Then, existence notification detection unit 114b passes a list of detected devices to UI control unit 511 (S201a).

[2] UI control unit 511 issues a command to drawing unit 116b to display the list of the detected devices on a screen. Drawing unit 116b allows display device 120b to display the list of the detected devices on a screen (S601).

[3] UI control unit 511 allows a display for prompting a user to select a device to be connected from the displayed list of detected devices on a screen. Screen 710 in FIG. 7A shows an example of a screen image displayed in step S601. Screen 710 shows that four devices are detected according to list 711. Furthermore, in information on the screen, a message for prompting a user to input selection is displayed (S602).

[4] A user selects a device to be connected from the detected devices displayed in step S602. This operation is executed when a user operates input unit 111b and thereby UI control unit 511 grasps what device is selected. For example, in screen 710, selection is carried out by moving box cursor 712 to a desired communication connection device and determining it (S603).

[5] To the device selected in step S603, communication connection device 510 is connected. This operation is carried out when UI control unit 511 commands so that communication unit 113b is connected to the device selected by UI control unit 511 in step S602 (S604).

[6] UI control unit 511 allows display device 120b to display the completion of connection. For example, screen 720 in FIG. 7B displays that a DVD recorder is connected (S605).

The merit of wireless communication is that physical connection is not necessary as mentioned above. However, there is a demerit that devices that are present in the vicinity may be detected mistakenly. For example, when a device of another house in a condominium is located at the reverse side of the wall of the user's device, since the physical distance is small, the device may be detected mistakenly.

If the device of another house is detected mistakenly, the device is mistaken as the user's device and connected thereto. On the contrary, the user's device may be used by another user of another house. Alternatively, there is a problem of privacy that a user of one house knows what kind of devices is used in other houses.

A method for avoiding detection error, according to a standard of wireless LAN, includes a method of registering a network name common to all the devices to be connected. In this case, only devices having the same network name as the registered network name are detected.

However, inputting the network name into respective devices is complicated unless a sufficient input/output device is provided. Furthermore, when an operator inputs the network name, even if only one letter is typed mistakenly, connection cannot be carried out. The inputting is a stressful and complicated procedure.

SUMMARY OF THE INVENTION

In order to dissolve the above-mentioned problems, in the present invention, firstly, one or a plurality of existing communication connection devices are detected. Next, the state of power supply of the detected communication connection device is examined. Next, to a user, it is presented that a device whose power supply is next turned on will be connected. Then, the user turns on the power supply of the communication connection device to be connected. Next, the state of power supply of the communication connection device is examined again so as to search a device whose power supply is turned on. Then, a device whose power supply is turned on is connected. Finally, the connected device is displayed.

In accordance with the communication connection method and device of the present invention, the device is not connected to equipment in another house mistakenly, and a problem of privacy, in which the presence of equipment in another house is unnecessarily known, does not occur. Furthermore, by only carrying out the most basic operation that power supply of a device to be connected is turned on in accordance with a display on a screen, a device to be connected can be specified. At this time, it is not necessary to input network name carried out in the connection of wireless LAN. Thus, the complicated operation, that is, inputting of network name is not necessary.

BRIEF DESCRIPTION OF THE DRAWINGS

FIG. 4A is a diagram showing another displayed screen of the display device in accordance with the first exemplary embodiment of the present invention.

FIG. 4B is a diagram showing another displayed screen of the display device in accordance with the first exemplary embodiment of the present invention.

FIG. 4C is a diagram showing another displayed screen of the display device in accordance with the first exemplary embodiment of the present invention.

FIG. 4D is a diagram showing another displayed screen of the display device in accordance with the first exemplary embodiment of the present invention.

FIG. 4E is a diagram showing another displayed screen of the display device in accordance with the first exemplary embodiment of the present invention.

FIG. 4F is a diagram showing another displayed screen of the display device in accordance with the first exemplary embodiment of the present invention.

FIG. 4G is a diagram showing another displayed screen of the display device in accordance with the first exemplary embodiment of the present invention.

FIG. 7A is a screen display of a conventional communication connection device.

FIG. 7B is a screen display of a conventional communication connection device.

Figure 1:
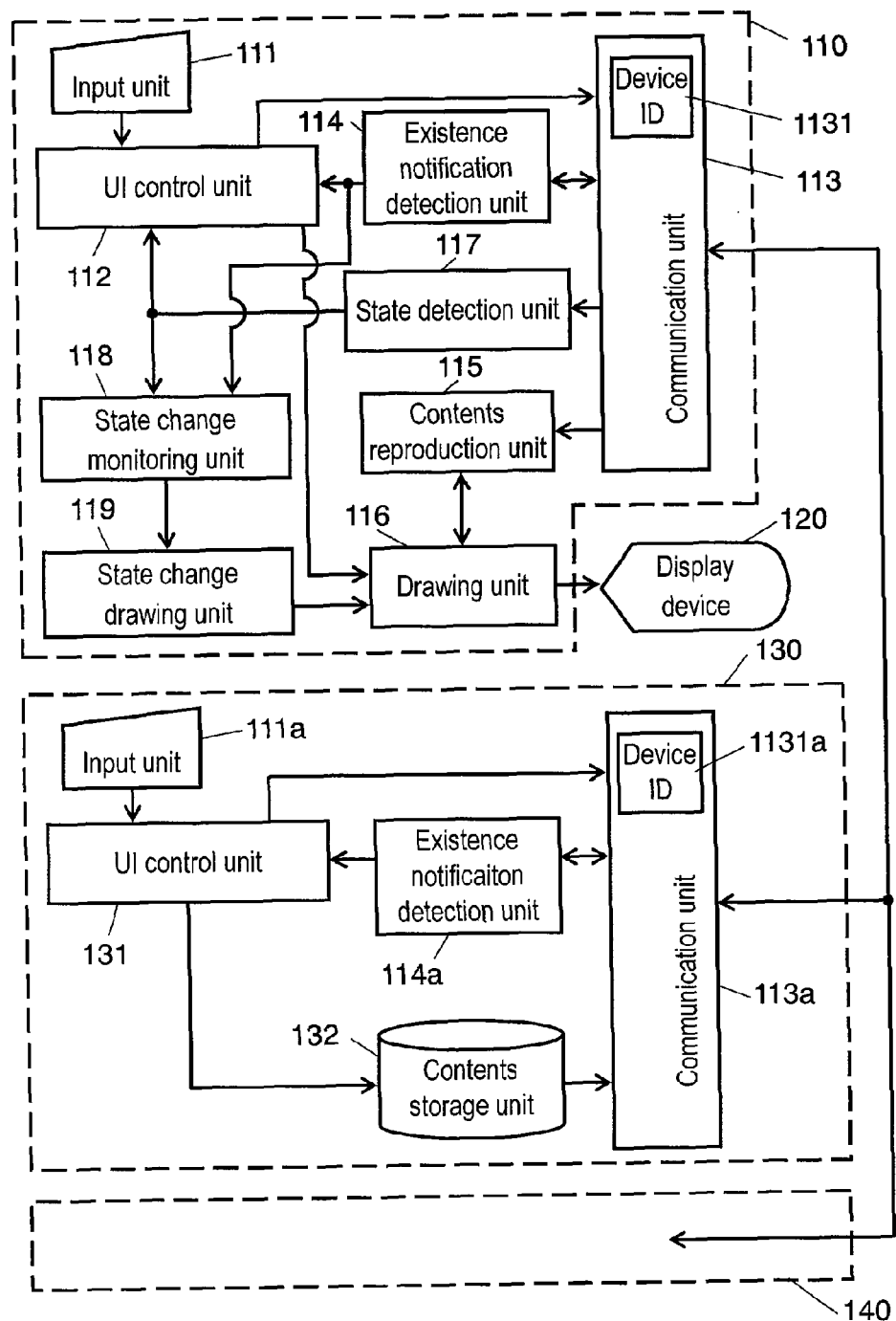
FIG. 1 is a diagram showing a configuration of a system of a communication connection device in accordance with the present invention.

REFERENCE MARKS IN THE DRAWINGS 110, 130, 140 communication connection device
111, 111a input unit
112, 131 UI control unit
113, 113a communication unit
1131, 1131a device ID
114, 114a existence notification detection unit
115 contents reproduction unit
116 drawing unit
117 state detection unit
118 state change monitoring unit
119 state change drawing unit
120 display device
132 contents storage unit

DETAILED DESCRIPTION OF THE PREFERRED EMBODIMENTS

The present invention can be used in a connecting operation at the time of purchasing and installing a television and a picture recorder such as a DVD recorder, which are to be connected to each other via wireless communication.

Alternatively, the present invention can be also used in a connecting operation between equipment connected by two-way communication between equipment realized by superimposing communication signals by using an antenna wiring laid in a house, communication between equipment by using a power line, or the like, instead of wireless communication.

First Exemplary Embodiment

FIG. 1 is a diagram showing a configuration of a system of a communication connection device in accordance with the present invention. In FIG. 1, communication connection device 110, communication connection device 130, and communication connection device 140 are mutually detectable by wireless communication. To communication connection device 110, display device 120 for displaying to a user is connected.

Communication connection device 110 includes input unit 111, UI control unit 112, communication unit 113, device ID 1131, existence notification detection unit 114, contents reproduction unit 115, drawing unit 116, state detection unit 117, state change monitoring unit 118, and state change drawing unit 119.

Input unit 111 is an input device to which a physical operation request by a user is input. Input unit 111 is a remote controller and a light receiver using infrared rays, a physical switch built in communication connection device 110, or a pointing device such as a mouse.

UI control unit 112 controls state transition of entire communication connection device 110. UI control unit 112 is a built-in computer for controlling, which includes a CPU and a semiconductor memory for storing and executing a computer program that determines the operation of the CPU. The state transition of UI control unit 112 is described later with reference to a flowchart.

Communication unit 113 is mutually connected to another communication unit built in another communication connection device, thereby carrying out two-way communication. Communication unit 113 is, for example, an LSI for realizing wireless LAN. Communication unit 113 holds device ID 1131 that is ID specific to each communication unit for distinguishing and identifying the communication unit from other communication units.

Device ID 1131 is a device ID stored in communication unit 113. When communication unit 113 is LSI of for wireless LAN, device ID 1131 is, for example, MAC address for distinguishing LAN connection devices all over the world.

Existence notification detection unit 114 performs broadcast communication to communication unit 113 with a wireless communication path. When another communication connection device receives a signal of broadcast communication, it detects the existence of communication connection device 110. Furthermore, when existence notification detection unit 114 receives a signal of broadcast communication released by another communication connection device, it can detect the existence of the other communication connection device.

Contents reproduction unit 115 receives contents that have been received by communication unit 113, and reproduces and outputs them to drawing unit 116 in accordance with the control by UI control unit 112. Herein, contents include information such as picture, music, and Web page, which a user views via display device 120. When contents reproduction unit 115 may be MPEG-2 video decoder when the contents are MPEG-2 video.

Drawing unit 116 receives an input of information for drawing contents output by contents reproduction unit 115 and information for drawing a screen of GUI output by UI control unit 112, generates display information of a screen by synthesizing the above-mentioned information, converts the display information into a signal format that can be input to display device 120, and outputs it. Drawing unit 116 is a drawing LSI such as a graphic accelerator.

State detection unit 117 is connected to communication unit 113. State detection unit 117 observes the state of power supply of other communication connection devices and output information when the change of the state of power supply is observed. As a method for mutually exchanging the states of power supply, any protocols such as SNMP (Simple Network Management Protocol) for exchanging the states of devices may be used. Specifically, the state of power supply may be reported regularly or the state may be reported when a command to request of reporting the state of power supply and the like is arrived in communication.

State change monitoring unit 118 monitors the change of the state of power supply with respect to one or a plurality of detectable equipment. State change monitoring unit 118 receives an input of a list of detectable communication connection devices output by existence notification detection unit 114 and the change of the state output by state detection unit 117. Then, when the change of the state of power supply is observed, state change monitoring unit 118 outputs a pair of information specifying the communication connection device whose state of power supply has been changed and the changed state.

State change drawing unit 119 receives an input of the pair output by the state change monitoring unit and outputs an image of a screen showing the change. Herein, the output screen image is synthesized by drawing unit 116 and is output to display device 120.

Display device 120 receives the output from communication connection device 110, converts it into a physical phenomenon such as a screen display or sound which a user can perceive, and presents it to a user. Display device 120 is, for example, a graphics display such as LCD and a speaker.

Communication connection device 130 includes input unit 111a, UI control unit 131, communication unit 113a, device ID 1131a, existence notification detection unit 114a, and contents storage unit 132. Communication connection device 130 is the same as that of a conventional communication connection device 530. However, it is necessary that communication unit 113a operates so as to realize a protocol for informing communication connection device 110 of the state of the power supply of communication connection device 130.

Communication connection device 140 may be the same as communication connection device 130.

Figure 2:
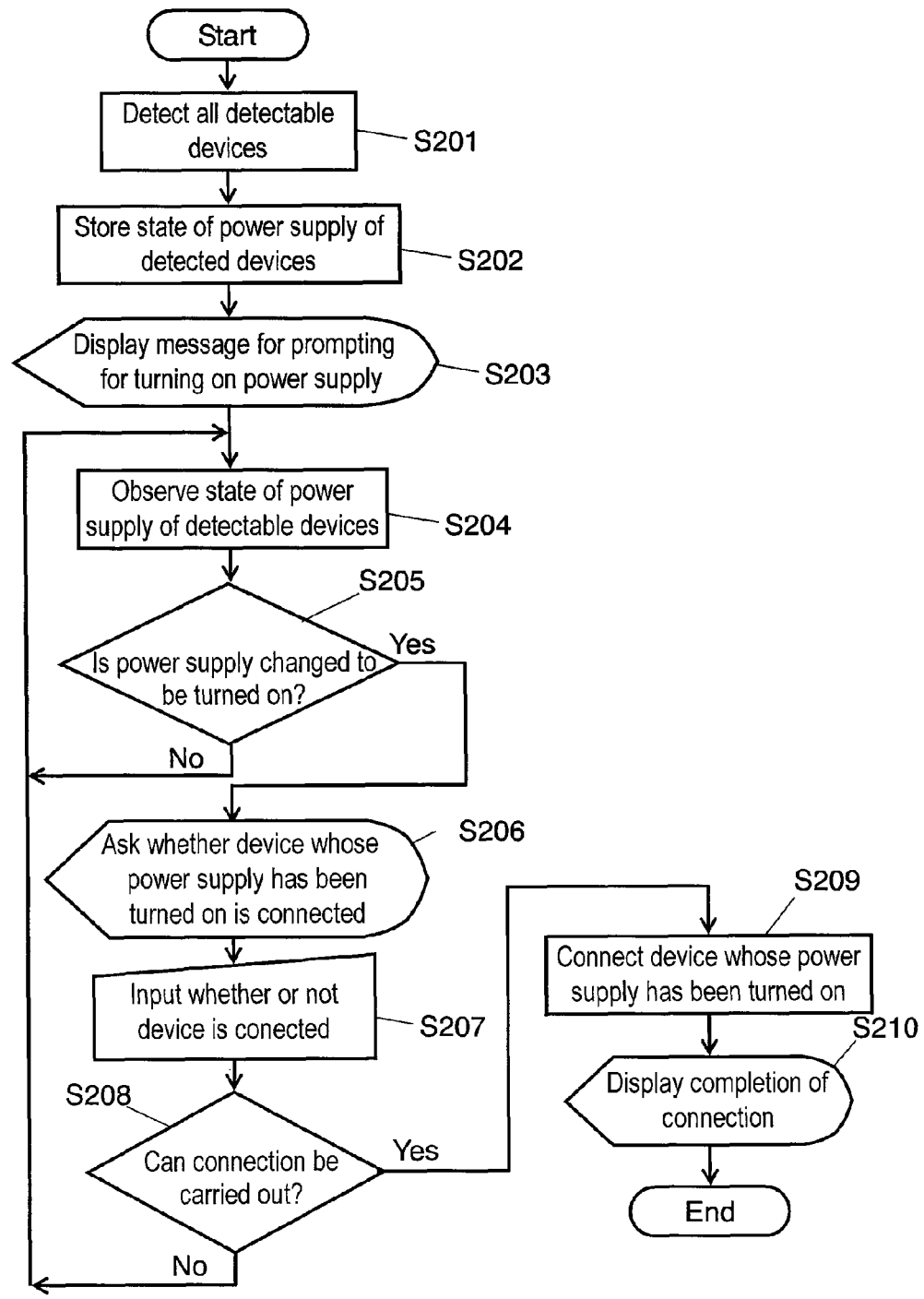
FIG. 2 is a flowchart showing connection processing of the communication connection device in accordance with the present invention.

Next, an operation of connecting a DVD recorder (DMR-7) that is communication control device 130 to communication control device 110 is described. FIG. 2 is a flowchart showing connection processing of the communication connection device in accordance with the present invention.

Hereinafter, the flow of processing is described in the order shown in steps in FIG. 2.

[1] Existence notification detection unit 114 analyzes information received by communication unit 113 and detects one or a plurality of detectable communication connection devices. Then, existence notification detection unit 114 passes a list of detected devices to UI control unit 112 (S201).

[2] State change monitoring unit 118 stores the state of power supply of the detected devices with respect to each of one or a plurality of communication connection devices detected by existence notification detection unit 114 based on the information of the state of power supply from state detection unit 117 (S202).

Figure 3A:
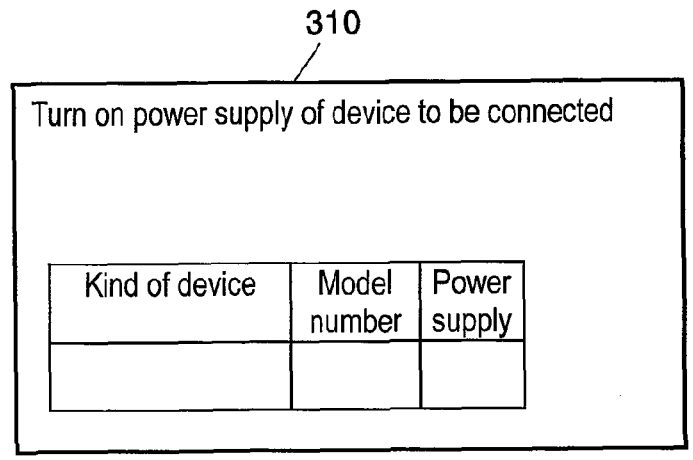
FIG. 3A is a diagram showing a displayed screen of a display device in accordance with a first exemplary embodiment of the present invention.
Figure 3B:
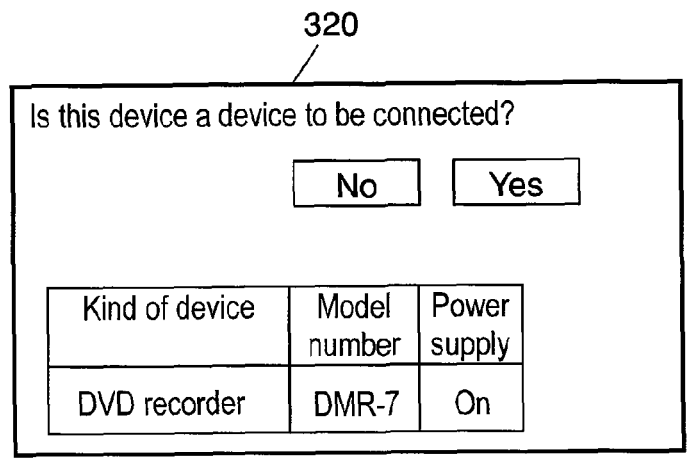
FIG. 3B is a diagram showing a displayed screen of the display device in accordance with the first exemplary embodiment of the present invention.
Figure 3C:
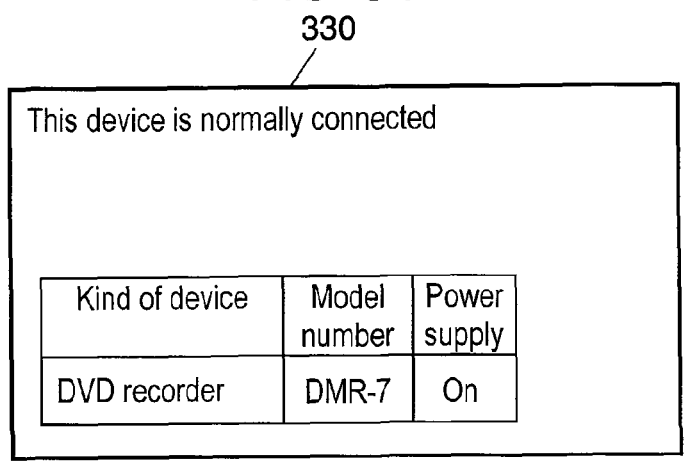
FIG. 3C is a diagram showing a displayed screen of the display device in accordance with the first exemplary embodiment of the present invention.
Figure 5:
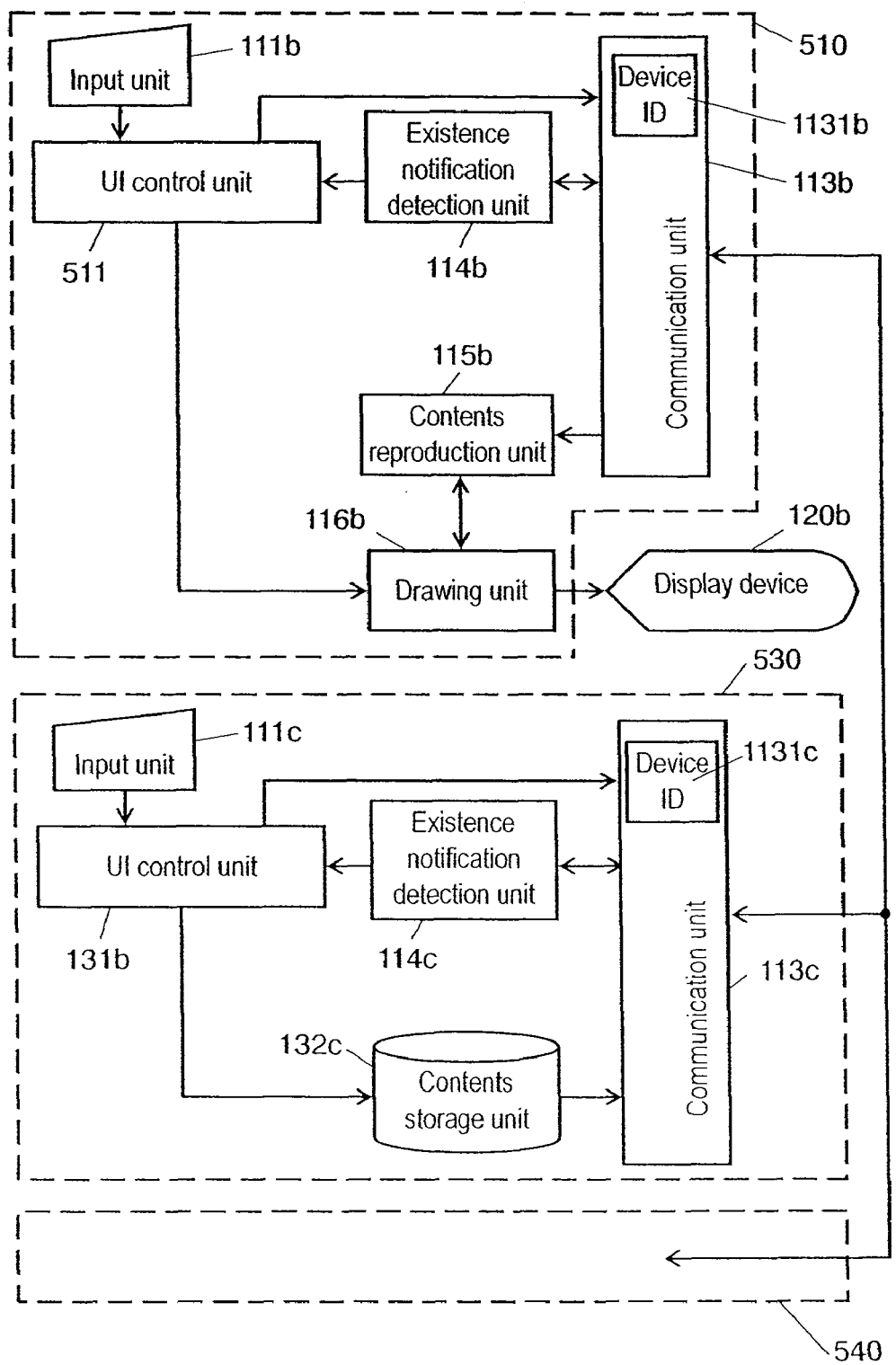
FIG. 5 is a diagram showing a configuration of a system of a conventional communication connection device.
Figure 6:
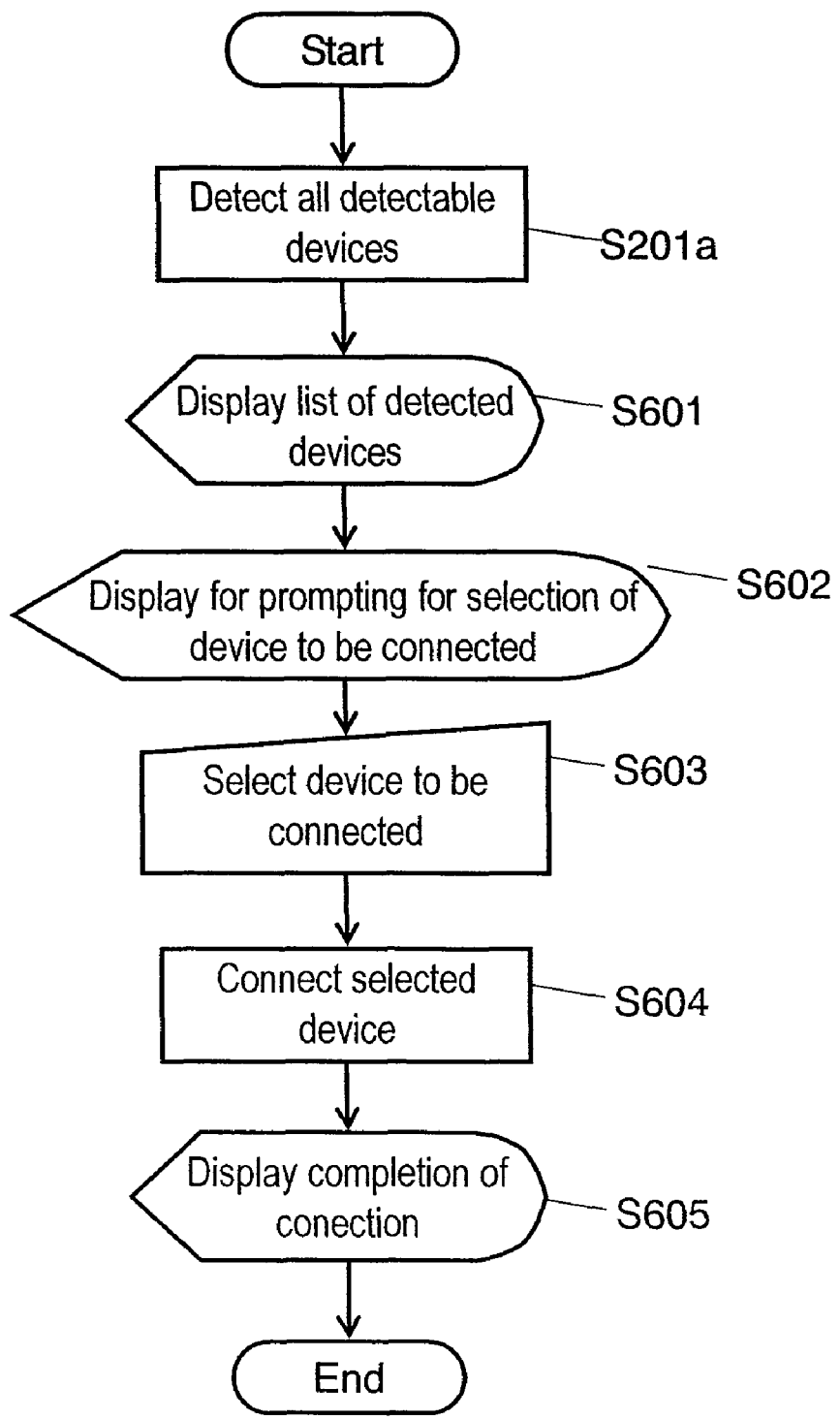
FIG. 6 is a flowchart of connection processing in a conventional communication connection device.

[3] UI control unit 112 issues a request to drawing unit 116 so as to display a message on display device 120 for prompting for turning on the power supply. FIGS. 3A, 3B, and 3C show displayed screens of the display device in the communication connection device in accordance with the first exemplary embodiment of the present invention. Screen 310 shown in FIG. 3A includes a message: "Turn on power supply of equipment to be connected" (S203).

[4] Again, state change monitoring unit 118 receives an input of information from state detection unit 117 and observes the state of power supply of the detectable devices. State change monitoring unit 118 determines whether or not the state of the power supply is changed from off to on in any of communication connection devices (S204).

[5] When it is determined that the state of power supply is changed in any of the communication equipment, the step goes to step S206. Otherwise, the step returns to step S204 (S205).

[6] Confirmation screen is presented to a user for asking whether or not connection is really carried out to the communication connection device that has been determined to be turned on in step S204. This processing is executed by the request to drawing unit 116 by UI control unit 112. At this time, screen 320 of FIG. 3B is displayed on display device 120 (S206).

[7] Information whether or not connection can be carried out, which has been confirmed in step S206, is obtained, by the user's input into input unit 111. This information is transmitted to UI control unit 112 (S207).

[8] When the input in step S207 shows that connection can be carried out, the step goes to step S209. Otherwise, the step returns to step S204 (S208).

[9] To the communication connection device whose power supply is determined to be turned in step S205, actual connection processing is carried out (S209).

[10] Display device 120 displays the completion of connection. At this time, screen 330 of FIG. 3C is displayed (S210).

As mentioned above, by a simple operation of turning on the power supply of a device to be connected in accordance with a guidance displayed on the screen of display device 120, communication connection device 130 can be connected to communication connection device 110. At this time, communication connection device 140 is also detectable from communication connection device 110. However, a user does not connect communication connection device 140 to communication connection device 110 because device 140 is not displayed on the screen of display device 120.

Furthermore, also when screen 320 displays a current state of the power supply and waits for the input whether or not connection can be carried out in step S207, if the state of the power supply is changed, state change drawing unit 119 operates so that the display of the state is updated. After step S202 in which firstly the state of the power supply is detected, if not only the power supply of communication connection device 130 but also the power supply of the projector (PRJ-1) that is communication connection device 140 used by another family is turned on by accident, both communication connection devices are additionally displayed on screen 320. The screen at this time is shown in screen 411 of FIG. 4A. Even under such circumstances, a user changes on/off state of the power supply of communication connection device 130 several times, and thereby the user can judge which device is possessed by the user's family.

Next, examples of the other displayed screens are described with reference to FIGS. 4B, 4C, 4D, 4E and 4F.

FIGS. 4A to 4F are views showing other displayed screens of a display device in the communication connection device in accordance with the first exemplary embodiment of the present invention. In FIG. 4B, screen 421 shows an example of a screen displayed on display device 120 for specifying the device to be connected more reliably. Screen 421 requests a user to repeat to turn on/off the power supply of communication connection device 130 to be connected twice. Only in the case where the power supply is turned on/off twice or more repeatedly, state change monitoring unit 118 determines that the state of the power supply is changed. Thereby, even when the power supply of another communication connection device 140 is turned on by accident, connection is carried out correctly.

Furthermore, in screen 431 shown in FIG. 4C, in order to protect privacy, the serial number of equipment is displayed with hidden letters by using mark "*" in part. A user possessing this equipment checks letters that are not shown with hidden letters, and can judge that the communication connection device, which is possessed not by the other family but by the user's family, is detected. Every time on/off of the power supply is repeated, hidden letters may be decreased.

Furthermore, in screen 441 shown in FIG. 4D, the box cursor is automatically moved to the equipment whose power supply is turned on lastly. When the box cursor is placed, the equipment on which the box cursor is placed may be the user's communication connection device even if the user does not continue to view the state displayed on the screen in which power supply is changed on and off.

Furthermore, in screen 451 shown in FIG. 4E, a plurality of detectable communication connection devices are displayed in a list. Herein, when the power supply of one communication connection device (herein, a rear speaker) is turned on, the rear speaker moves to the top of the list as shown in screen 452 shown in FIG. 4F. A user can judge which, device is the user's own device in one glance because it is displayed on the top of the list.

The first exemplary embodiment describes a case where connection between devices is wireless connection. However, also in the case where devices are communicated to each other by way of a power line inserted into an AC outlet, since the presence of the device of another room or house may be detected mistakenly, this exemplary embodiment is applicable.

It is described that on/off of the power supply of the communication connection device is changed by operating the input unit. However, the power supply may be turned on by inserting an AC plug for supplying the communication connection device with power supply from a power line into an AC outlet of the power line.

It is described that the state detected by the state detection unit is an on/off state of the power supply of the communication connection device. However, instead of a user's turning on/off operation to the power supply, any other operations may be performed with respect to an input unit so as to cause some changes in the state and such operation information may be detected. For example, a communication connection device may be provided with a specific connection confirmation button for confirming connection. Alternatively, operation information that, for example, a reproducing button or a determination button is pushed may be detected.

In the first exemplary embodiment, as a communication connection part, wireless communication is used. However, CEC (Consumer Electronics Control) of HDMI (High Definition Multimedia Interface) may be used. HDMI is a multimedia interface and has intelligent functions capable of transferring picture and voice, which are not in a compressed format, from one communication connection device to another communication connection device, and capable of recognizing communication connection devices each other via a communication line for carrying out physical bus type access, which are contained in an HDMI cable. Furthermore, CEC of HDMI is an equipment control signal and a control protocol standardized by HDMI.

INDUSTRIAL APPLICABILITY

A communication connection method and device of the present invention are useful as means for connecting between devices by a simple operation without fail under circumstances in which a large number of devices capable of communication connection are introduced in neighboring houses and radio wave leaks.

The invention claimed is:

1. A communication connection device, comprising:
a display unit for prompting a user to change an operational state of an other communication connection device operating in a standby state,
wherein the user, exclusive of the communication connection device, changes the operational state of the other communication connection device from the standby state to an ON state;
a state change monitoring unit for monitoring a change in the operational state of the other communication connection device;
a state change drawing unit for controlling the display unit to display information to the user for identifying the other communication connection device when the operational state of the other communication connection device is indicated by the state change monitoring unit as being changed from the standby state to the ON state; and
an input unit for confirming by the user, a connection between the communication connection device and the other communication connection device in response to viewing the displayed identifying information.

2. The communication connection device of claim 1, wherein the operational state is on-off operation information of a power supply.

3. The communication connection device of claim 1, wherein the state change monitoring unit determines the operational state of the other communication connection device by receiving the operation information a plurality of times.

4. The communication connection device of claim 1, wherein the state change monitoring unit determines the operational state of the other communication connection device from on-off operation information of a connection confirmation button of the other communication connection device.

5. The communication connection device of claim 1, wherein the state change drawing unit displays a prompt for prompting the user to perform an operation on the other communication connection device to be connected.

6. The communication connection device of claim 5, wherein the operation performed on the other communication connection device is an operation of turning on or off a power supply.

7. The communication connection device of claim 5, wherein the operation performed on the other communication connection device is pushing a reproducing button or a determination button.

8. The communication connection device of claim 1, wherein the state change drawing unit displays the communication connection device to be connected with hidden letters.

9. The communication connection device of claim 8, wherein the state change drawing unit displays hidden letters and the hidden letters change based on the change of the state of the other communication connection device.

10. The communication connection device of claim 1, wherein the communication unit performs connection to the communication connection device to be connected, when the device is determined to be the communication connection device to be connected in the input unit.

11. The communication connection device of claim 1, wherein the communication between the communication connection devices is carried out via wireless communication.

12. The communication connection device of claim 1, wherein the communication between the communication connection devices is carried out via CEC (Consumer Electronics Control) of HDMI (High Definition Multimedia Interface).

13. A communication connection method of a communication connection device, comprising:
prompting a user to change an operational state of an other communication connection device operating in a standby state,
wherein the user, exclusive of the communication connection device, changes the operational state of the other communication connection device from the standby state to an ON state;
monitoring a change in the operational state of the other communication connection device;
displaying, on a display, identifying information for identifying the other communication connection device whose operational state has changed from the standby state to the ON state; and
confirming, by a user, a connection between the communication connection device and the other communication connection device in response to the displayed identifying information.

14. The communication connection method of claim 13, the method comprising:
prompting a user to change the operational state of a device to be connected;
selecting the operated device among existing detectable devices;
confirming by the user whether the selected device is a device to be connected; and
allowing the selected device to be connected.

15. The communication connection method of claim 14, wherein the operational state is an on-off operation of power supply.

16. The communication connection method of claim 14, wherein prompting the user to change the operational state of the device to be connected is performed by displaying a prompt.

17. The communication connection method of claim 14, wherein the confirming by the user whether the selected device is a device to be connected is performed by displaying a prompt.

18. A storage medium storing a computer program for realizing the communication connection method of claim 14.

* * * * *